United States Patent
Wu et al.

(10) Patent No.: US 8,254,532 B2
(45) Date of Patent: Aug. 28, 2012

(54) NETWORK VIDEOCONFERENCE EQUIPMENT AND ITS METHOD OF PROCEEDING NETWORK VIDEOCONFERENCE

(75) Inventors: Chih-Wei Wu, Taipei Hsien (TW); Yung-Chun Lin, Taipei Hsien (TW); Chia-Shui Weng, Taipei Hsien (TW)

(73) Assignee: AVer Information Inc., New Taipei (TW)

( * ) Notice: Subject to any disclaimer, the term of this patent is extended or adjusted under 35 U.S.C. 154(b) by 215 days.

(21) Appl. No.: 12/841,181

(22) Filed: Jul. 22, 2010

(65) Prior Publication Data

US 2012/0019611 A1    Jan. 26, 2012

(51) Int. Cl.
*H04M 11/00* (2006.01)
(52) U.S. Cl. ............... 379/88.13; 348/14.01; 379/93.17
(58) Field of Classification Search ............... 348/14.01; 379/88.13, 142.01, 93.17
See application file for complete search history.

(56) References Cited

U.S. PATENT DOCUMENTS

| | | | | |
|---|---|---|---|---|
| 7,174,163 B2 * | 2/2007 | Aksu et al. | ................. | 455/414.1 |
| 8,081,738 B2 * | 12/2011 | Takeda et al. | ................... | 379/45 |
| 8,081,751 B1 * | 12/2011 | Martin et al. | ............ | 379/373.01 |
| 2002/0025026 A1 * | 2/2002 | Gerszberg et al. | ............ | 379/67.1 |
| 2006/0050685 A1 * | 3/2006 | Sung et al. | ..................... | 370/352 |
| 2007/0211872 A1 * | 9/2007 | Cai et al. | .................. | 379/142.01 |

FOREIGN PATENT DOCUMENTS

| | | |
|---|---|---|
| CN | 1710953 A | 12/2005 |
| CN | 101360213 A | 2/2009 |

* cited by examiner

*Primary Examiner* — Olisa Anwah
(74) *Attorney, Agent, or Firm* — CKC & Partners Co., Ltd.

(57) ABSTRACT

A network videoconference equipment and its method of proceeding network videoconference are provided. The method implemented on a first terminal machine of a network videoconference system includes steps as follows. Directly connecting with a second terminal machine of the system when the second terminal machine requests to do so. Receiving and presenting a second location video and voice from the second terminal machine, sending a first predetermined message picture to the second terminal machine, and not sending a first location video and voice temporarily. Providing a human-machine interface on the first terminal machine for accepting an instruction of proceeding the network videoconference or not.

11 Claims, 5 Drawing Sheets

NETWORK VIDEOCONFERENCE EQUIPMENT AND ITS METHOD OF PROCEEDING NETWORK VIDEOCONFERENCE

BACKGROUND

1. Technical Field

The disclosure relates to a method of exchanging network information, more particularly to network videoconference equipment and its method of proceeding network videoconference.

2. Description of Related Art

Due to rapid growth of economy, companies set on a single site hardly meet the business requirements thereof. Thus, distributed operation or international operation has been accepted in the business model for the normal companies, and the communication issues of how well people communicate with each other between the different sites of the same company need to be considered recently.

However, since networks, computers and electronic technologies are getting innovative and progressive, communication between two distanced sites is no longer a problem, that is, by using a network videoconference system, communication between two remote sites will not be limited in distance and time.

When a network videoconference machine ("called machine" hereinafter) at a local site in a network detects that another network videoconference machine ("calling machine" hereinafter) of a remote site in the network is calling to the called machine, meeting participators at the local site control the called machine to decide whether to accept or reject to communicate with meeting participators at the remote site.

When the called machine is instructed to get through the calling machine to communicate with the meeting participators at the remote site, the called machine and the calling machine will mutually provide video and audio signals of their meeting environments. Thus, the meeting participators at the local site and the remote site mutually recognize the people who on the opposite party actually join the meeting by the video and audio signals of the meeting environments.

On the other hand, when the called machine is instructed to reject the call from the calling machine, the called machine and the calling machine fail to provide video and audio signals of the meeting environments to each other.

However, what really bothers the meeting participators at the local site is that before the called machine and the calling machine are connected with each other, the meeting participators at the local site can only identify the remote site by the IP address and the user name of the calling machine from the called machine, and the meeting participators at the local site cannot recognize people who on the remote site actually join the meeting.

Instead, the meeting participators at the local site can recognize people who on the remote site actually join the meeting by the video and audio signals of the meeting environment provided from the calling machine until the called machine and the calling machine are connected to each other, at the same time, the meeting participators at the local site also can be seen by the meeting participators at the remote site from the video and audio signals of the meeting environment provided from the called machine.

In view of the mentioned prior arts, how to develop a solution for improving the mentioned disadvantages shall be concerned.

SUMMARY

Therefore, an aspect of the disclosure is to present a network videoconference equipment and its method of proceeding network videoconference, which helps the meeting participators at the local site to know people who on the remote site actually join the meeting so that meeting participators at the local site can react in advance in relative to people who on the remote site actually join the meeting before a decision whether to further join the network videoconference or not is made.

Another aspect of the disclosure is to present a network videoconference equipment and its method of proceeding network videoconference, which effectively keeps the meeting participators at the local site being unknown from the meeting participators at the remote site so as to protect personal privacy of the meeting participators at the local site before a decision whether to further join the network videoconference or not is made.

The method of proceeding network videoconference of the disclosure is implemented on a first terminal machine of a network videoconference system. The method comprises steps as follows. Directly establishing a connection with a second terminal machine of the network videoconference system without waiting for any instruction of permission when the second terminal machine requests to connect with the first terminal machine. Receiving a second location video and voice provided from the second terminal machine and presenting the second location video and voice on the first terminal machine, sending a first predetermined message picture to the second terminal machine to present, and not sending a first location video and voice temporarily. Providing a human-machine interface on the first terminal machine, wherein the human-machine interface is for accepting an instruction of proceeding the network videoconference or an instruction of rejecting the network videoconference.

In one of the embodiments of the disclosure, the method of proceeding network videoconference further comprises a step of starting to send a first location video and voice provided from the first terminal machine to the second terminal machine to present instead of the first predetermined message picture, when the human-machine interface accepts the instruction of proceeding the network videoconference.

In another one of the embodiments of the disclosure, the method of proceeding network videoconference further comprises a step of disconnecting with the second terminal machine when the human-machine interface accepts the instruction of rejecting the network videoconference. In addition, when the human-machine interface accepts the instruction of rejecting the network videoconference, the method further comprises a step of sending a second predetermined message picture to the second terminal machine to present instead of the first predetermined message picture before disconnecting with the second terminal machine.

In the other of the embodiments of the disclosure, the first predetermined message picture is a static picture such as a text message, a patterned message or a combination thereof.

In the other of the embodiments of the disclosure, the first predetermined message picture is an animated picture such as progress animation, a repeated motion animation or a combination thereof.

The network videoconference equipment of the disclosure comprising a network videoconference device, a network video camera, an audio receiving device, and a media player. The network videoconference device at a local terminal is for establishing a connection with a network device at a remote terminal via a network, and the network videoconference device comprises a first predetermined message picture and a human-machine interface served for accepting an instruction of agreeing a network videoconference or an instruction of rejecting a network videoconference. The network video camera is electrically connected with the network videoconference device, and the network video camera is for obtaining first location videos from the local terminal. The audio receiving device is electrically connected with the network videoconference device, and the audio receiving device is for obtaining first location voices from the local terminal. The media player is electrically connected with the network videoconference device, and media player is for presenting second location videos and voices provided from the network device at the remote terminal via the network.

When the network device requests to connect with the network videoconference equipment, the network videoconference equipment directly connects with the network device, and the network videoconference equipment receives and presents the second location videos and voices from the network device, and, the network videoconference equipment sends the first predetermined message picture to the network device to display, not the first location videos and voices temporarily, and the network videoconference equipment waits for the instruction thereof in order to proceed the network videoconference or not.

In one of the embodiments of the disclosure, the network videoconference device further comprises a second predetermined message picture. Thus, when the human-machine interface of the network videoconference device accepts the instruction of rejecting the network videoconference, the network videoconference device sends the second predetermined message picture to the network device to display instead of the first predetermined message picture.

In the other of the embodiments of the disclosure, the human-machine interface is a virtual operation interface or a mechanical operation interface.

In the other of the embodiments of the disclosure, the virtual operation interface is with options showed on a screen of the media player.

In the other of the embodiments of the disclosure, the mechanical operation interface is with buttons, turning buttons or push buttons.

Therefore, the meeting participators with the first terminal machine can early obtain information that people who on the remote terminal actually join the meeting to react relatively in advance and to ensure personal privacy before the meeting participators with the first terminal make a decision of whether to further join the network videoconference or not.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1A:
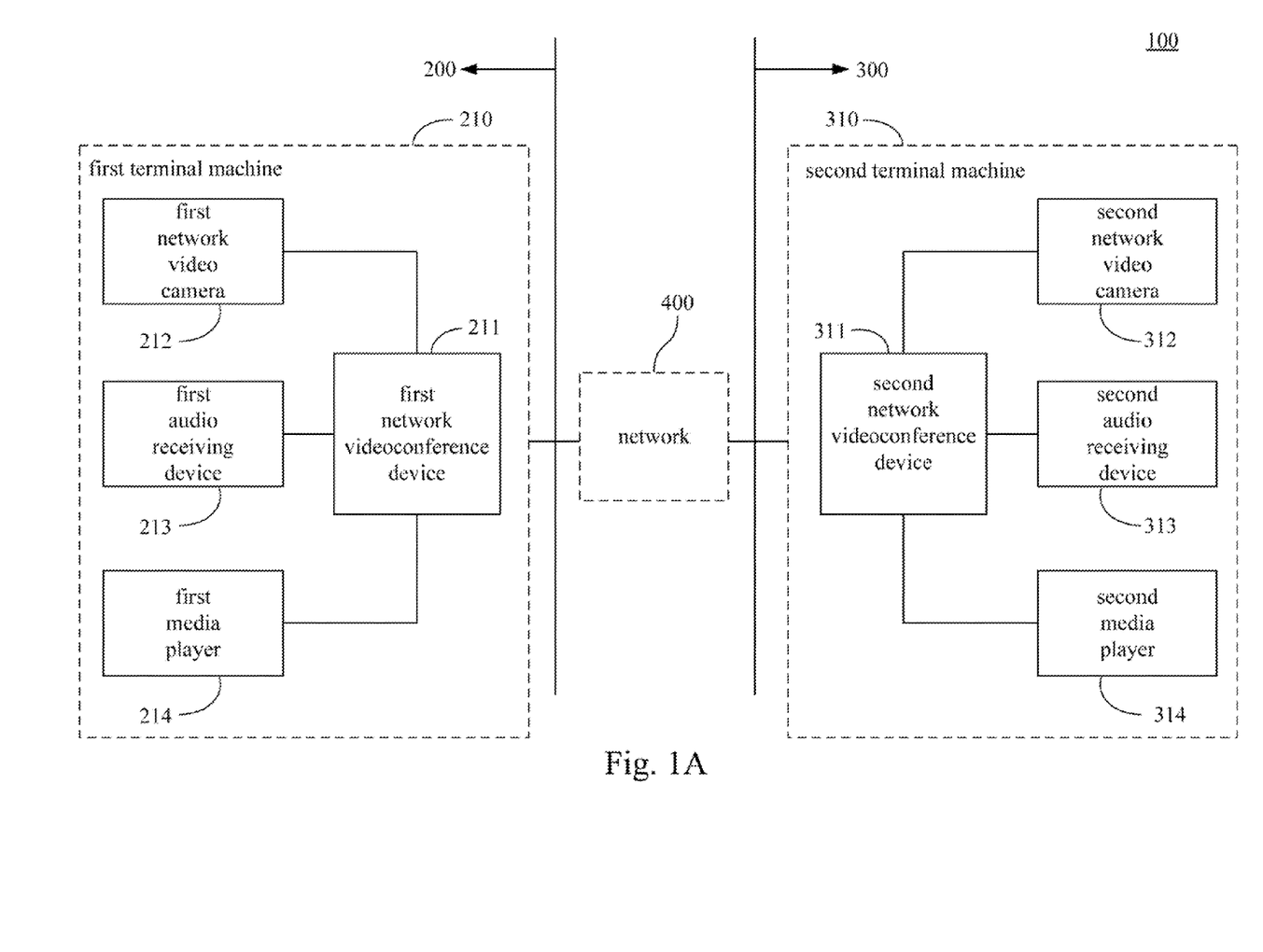
FIG. 1A illustrates a block diagram of a network videoconference equipment of a network videoconference system according to one embodiment of the disclosure.
Figure 1B:
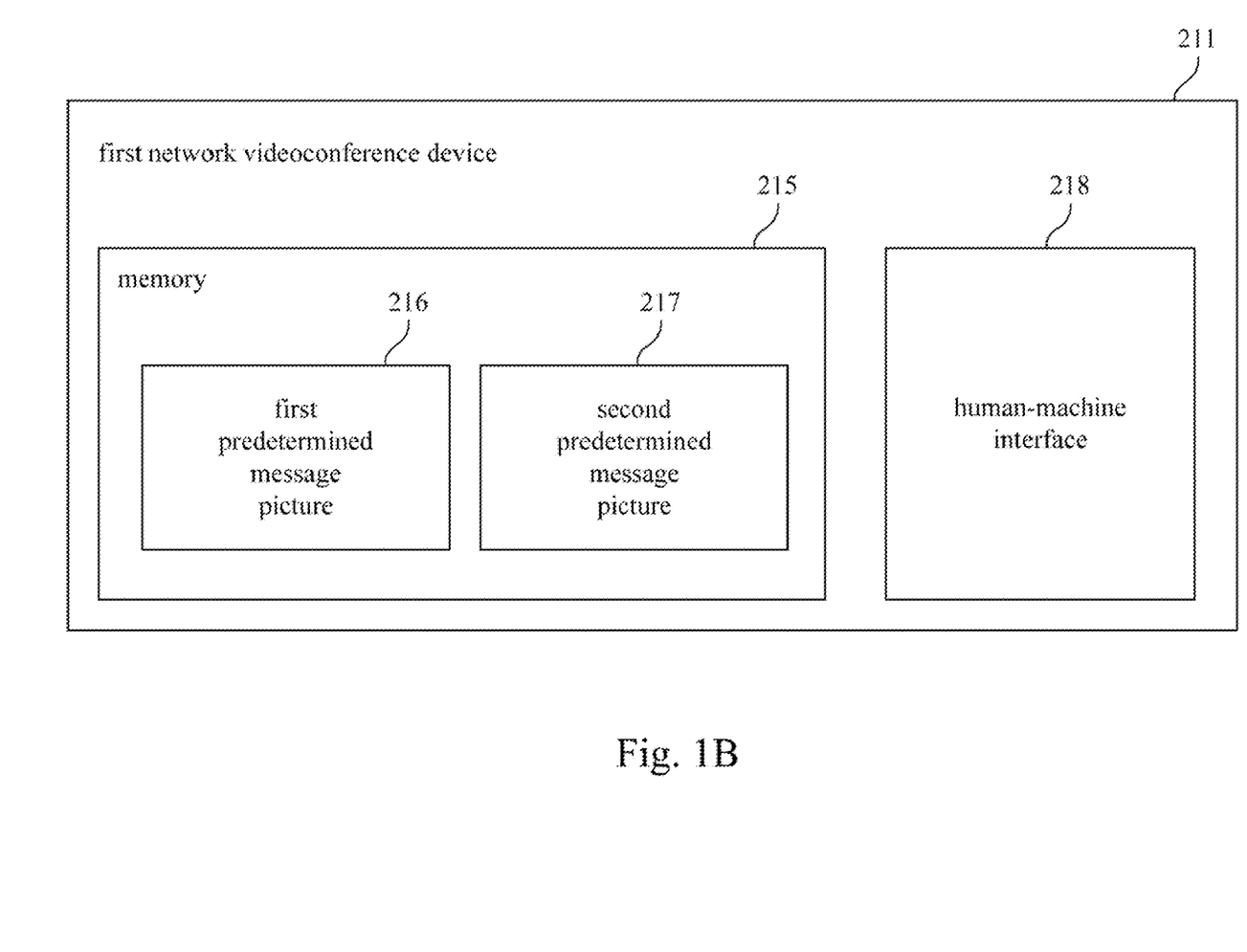
FIG. 1B illustrates a block diagram of the first network videoconference device of the first terminal machine in FIG. 1A.

Refer to FIG. 1A and FIG. 1B in which FIG. 1A illustrates a block diagram of a network videoconference equipment of a network videoconference system according to one embodiment of the disclosure; FIG. 1B illustrates a block diagram of the first network videoconference device of the first terminal machine in FIG. 1A.

In the embodiment of the disclosure, a network videoconference system 100 includes a plurality of network equipments which are spread in a network 400 and are able to communicate with each other via the network 400. For instance, a first network equipment (first terminal machine 210 hereinafter) and a second network equipment (second terminal machine 310 hereinafter).

The first terminal machine 210 is positioned at a local site ("first terminal" 200 hereinafter). The first terminal 200, for example, can be a called terminal. The second terminal machine 310 is positioned at a remote site ("second terminal" 300 hereinafter). The second terminal 300, for example, can be a calling terminal.

Also, in the embodiment, the first terminal machine 210, for example, is a network videoconference equipment or mobile phone. The second terminal machine 310, for example, is a network videoconference equipment or mobile phone. However, types of the first terminal machine 210 and the second terminal machine 310 are not limited to only those.

The first terminal machine 210 at least includes a first network videoconference device 211, a first network video camera 212, a first audio receiving device 213 and a first media player 214. The second terminal machine 310 at least includes a second network videoconference device 311, a second network video camera 312, a second audio receiving device 313 and a second media player 314. The second network videoconference device 311, for example, can be a remote network machine, a network videoconference device which performs the same functions with the first network videoconference device 211, or other network videoconference device that has existed in the market.

The first network videoconference device 211 and the second network videoconference device 311 are able to connect with each other to communicate via a network. The first network video camera 212 is electrically connected with the first network videoconference device 211, and obtains signals of first location videos from a meeting at the first terminal 200. The first audio receiving device 213 (e.g. microphone) is electrically connected with the first network videoconference device 211, and obtains signals of first location voices from the meeting at the first terminal 200. Here, both signals of first location videos and signals of first location voices can be called together as "first location video and voice".

The second network video camera 312 is electrically connected with the second network videoconference device 311, and obtains signals of second location videos from a meeting at the second terminal 300. The second audio receiving device 313 (e.g. microphone) is electrically connected with the second network videoconference device 311, and obtains signals of second location voices from the meeting at the second terminal 300. Here, both signals of second location videos and signals of second location voices can be called together as "second location video and voice".

Moreover, the first media player 214 of the first terminal machine 210 can be instructed to present (i.e. play) the second location video and voice from the second terminal 300 to the meeting participators at the second terminal 300. The second media player 314 of the second terminal machine 310 can be instructed to present (i.e. play) the first location video and voice from the first terminal 200 to the meeting participators at the first terminal 300.

Also, the first network videoconference device 211 further includes a memory 215 and a human-machine interface 218. The memory 215 is electrically connected with the first network videoconference device 211, and stored with at least one first predetermined message picture 216 and second predetermined message picture 217 therein in advance. Types and uses of those predetermined message pictures 216, 217 will be detailed behind. The human-machine interface 218 of the first network videoconference device 211 accepts an instruction of proceeding the network videoconference or an instruction of rejecting the network videoconference. Types and uses of the human-machine interface 218 will be detailed behind as well.

Figure 2:
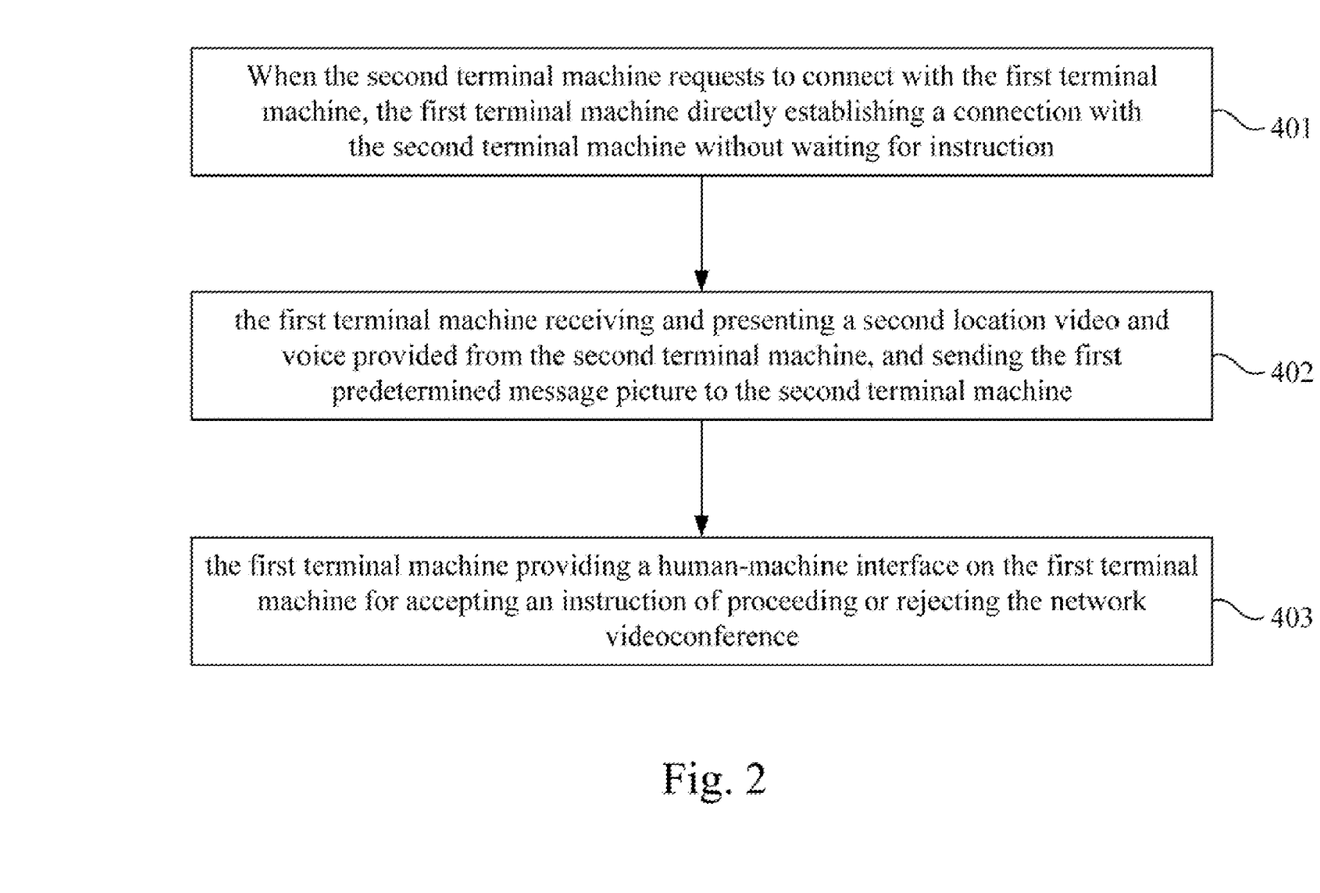
FIG. 2 illustrates a flow chart of a method of proceeding network videoconference according to the disclosure.

Refer to FIG. 1A, FIG. 1B and FIG. 2 in which FIG. 2 illustrates a flow chart of a method of proceeding network videoconference according to the disclosure.

A method of proceeding network videoconference disclosed in the disclosure is implemented on the network videoconference system 100 mentioned above. When the second terminal machine 310 requests to connect with the first terminal machine 210, the first terminal machine 210 operates according to the steps as follows.

Step (401) directly establishing a connection with the second terminal machine 310 without waiting for any instruction of permission.

Step (402) receiving a second location video and voice provided from the second terminal machine 310 and presenting the second location video and voice on the first terminal machine 310, and sending the first predetermined message picture 216 to the second terminal machine 310 to present, but not sending a first location video and voice to the second terminal machine 310 temporarily.

Here, the move of "receiving a second location video and voice provided from the second terminal machine 310 and presenting the second location video and voice on the first terminal machine 310", and the move of "sending the first predetermined message picture 216 to the second terminal machine 310 to present, but not sending a first location video and voice to the second terminal machine 310 temporarily" are progressed simultaneously; or the move of "sending the first predetermined message picture 216 to the second terminal machine 310 to present, but not sending a first location video and voice to the second terminal machine 310 temporarily" can be progressed in a duration of the move of "receiving a second location video and voice provided from the second terminal machine 310 and presenting the second location video and voice on the first terminal machine 310".

Step (403) providing a human-machine interface 218 mentioned above on the first terminal machine 210. Thus, the meeting participants can input an instruction of proceeding the network videoconference or an instruction of rejecting the network videoconference by the human-machine interface 218.

Therefore, before the meeting participants at the first terminal 200 make a decision of whether to join the network videoconference or not, the meeting participators at the first terminal 200 can obtain information early that people who on the remote terminal actually join the meeting to react relatively in advance, such as to prepare additional information regarding thereof, to be absent from the meeting, or to choose rejecting to proceed the network videoconference, so as to ensure personal privacy of the meeting participators at the first terminal 200.

Figure 3:
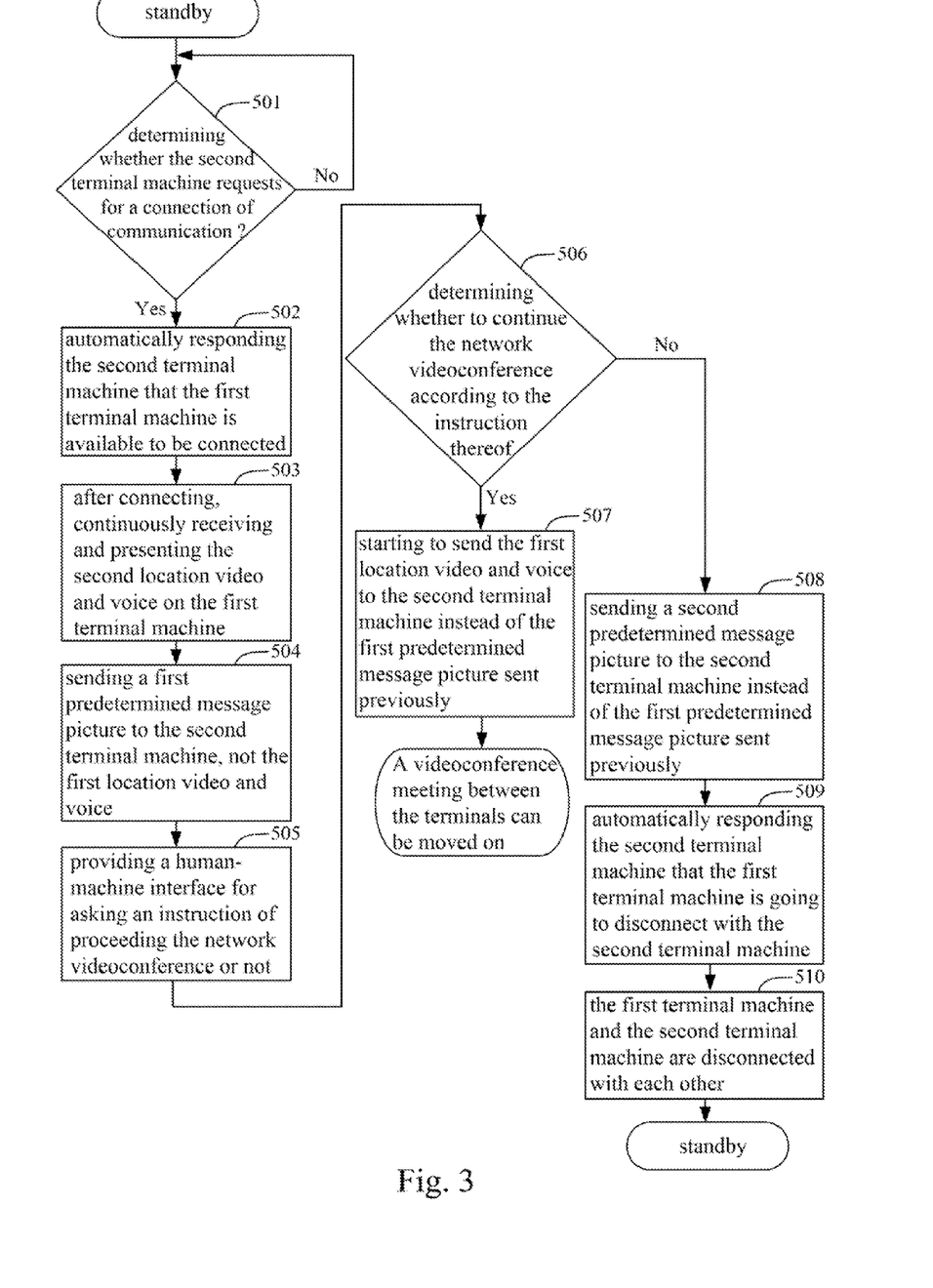
FIG. 3 illustrates a detailed flow chart of the method of proceeding network videoconference operated by the first terminal machine according to an embodiment of the disclosure.

Refer to FIG. 1A, FIG. 1B and FIG. 3 in which FIG. 3 illustrates a detailed flow chart of the method of proceeding network videoconference operated by the first terminal machine according to an embodiment of the disclosure.

In the embodiment of the disclosure, since the first terminal machine 210 of the first terminal 200 is passively waiting for a call from the second terminal 300, the first terminal 200 can be potentially took as a called terminal in the mentioned system 100. The detailed steps that the first terminal machine 210 works are described as follows.

Step (501) the first network videoconference device 211 determines whether the second network videoconference device 311 of one second terminal machine 310 requests for a connection of communication, if yes, process step (502), otherwise, back to step (501) again.

Step (502) the first network videoconference device 211 automatically responds the second network videoconference device 311 that the first network videoconference device 211 is available to be connected with the second network videoconference device 311.

Thus, the first network videoconference device 211 directly establishes a connection with the second terminal machine 310 without waiting for any instruction of permission. In this step, the first network videoconference device 211 obtains an IP address and a user name of the second network videoconference device 311 before the first network videoconference device 211 is connected with the second network videoconference device 311. Go to Step (503).

Step (503) after the first network videoconference device 211 and the second network videoconference device 311 are connected, the first network videoconference device 211 starts to continuously receive the second location video and voice provided from the second network videoconference device 311, and the first network videoconference device 211 then presents the second location video and voice continuously. Go to Step (504).

Step (504) While the first network videoconference device 211 is presenting the second location video and voice continuously, the first network videoconference device 211 dose not send the first location video and voice provided from the first network video camera 212 and the first audio receiving device 213 to the second terminal machine 310 at this moment, instead, the first network videoconference device 211 sends a first predetermined message picture 216 mentioned above to the second network videoconference device 311.

In this embodiment, the first predetermined message picture 216 can be a static picture, an animated picture or a combination of a static picture and an animated picture.

The static picture can be a text message, a patterned message or a combination of a text message and a patterned message. The text message, for example, can be texts as "progressing, please wait", "connecting" or alike. The patterned message, for example, can be a pattern of a trademark, a symbol that implies that the connection is progressing, or alike.

In the other of the embodiments of the disclosure, the animated picture can be a progress animation, a repeated motion animation or a combination of a progress animation and a repeated motion animation. The progress animation, for example, can be an animation of progressively ascending or descending percentages, an animation of a light bar progressively lengthened or shortened. The repeated motion animation for example, can be an animation of a sandglass repeatedly upside down. Go to Step (505).

Step (505) the first network videoconference device 211 provides a human-machine interface 218 mentioned above thereon or on a screen of the first media player 214. The human-machine interface 218 can be operated by the meeting participants at the first terminal 200 to input an instruction of proceeding the network videoconference or an instruction of rejecting the network videoconference.

The human-machine interface 218 can be a virtual operation interface or a mechanical operation interface, but not only be limited to a virtual operation interface or a mechanical operation interface.

One of the variations of the embodiment, the virtual operation interface, for example, can be provided with options shown on a screen of the first media player 214. Specifically, the first media player 214 can provide a dialog window having options of "agreeing to proceed the network videoconference" and "rejecting to proceed the network videoconference". When the option of "agreeing to proceed the network videoconference" is chosen by a cursor, the first network videoconference device 211 obtains an instruction of proceeding the network videoconference from the human-machine interface 218; otherwise, when the option of "rejecting to proceed the network videoconference" is chosen by the cursor, the first network videoconference device 211 obtains an instruction of rejecting the network videoconference from the human-machine interface 218.

Alternatively, another variation of the embodiment, the human-machine interface 218 can be a mechanical operation interface installed on the first network videoconference device 211, and the mechanical operation interface can be operated directly and physically. Specifically, the mechanical operation interface for example, can be provided with buttons, turning buttons or push buttons. When the mechanical operation interface is moved to choose the option of "agreeing to proceed the network videoconference" physically, the first network videoconference device 211 obtains an instruction of proceeding the network videoconference from the human-machine interface 218; otherwise, when the mechanical operation interface is moved to choose the option of "rejecting to proceed the network videoconference" physically, the first network videoconference device 211 obtains an instruction of rejecting the network videoconference from the human-machine interface 218. Go to Step (506).

Step (506) the first network videoconference device 211 determines whether to continue the network videoconference according to the instruction thereof, that is, the first network videoconference device 211 determines whether the first network videoconference device 211 obtains an instruction of agreeing or rejecting to proceed the network videoconference from the human-machine interface 218. If the instruction of proceeding the network videoconference is obtained, process step (507); otherwise, If the instruction of rejecting the network videoconference is obtained, process step (508).

Step (507) when the instruction of proceeding the network videoconference is obtained, the first network videoconference device 211 starts to send the first location video and voice provided from the first network video camera 212 and the first audio receiving device 213 to the second network videoconference device 311 instead of the first predetermined message picture 216 sent previously.

In other words, the first network videoconference device 211 changes the first predetermined message picture 216 to the first location video and voice to the second network videoconference device 311.

Therefore, a videoconference meeting between the first terminal 200 and the second terminal 300 can be moved on, and the meeting participators at the first terminal 200 and the second terminal 300 can be contacted to each other by the first location video and voice and the second location video and voice.

Step (508) when the human-machine interface 218 obtains an instruction of rejecting the network videoconference, the first network videoconference device 211 additionally sends a second predetermined message picture 217 to the second network videoconference device 311 instead of the first predetermined message picture 216 sent previously.

In this embodiment, the second predetermined message picture 217 can be a static picture, an animated picture or a combination of a static picture and an animated picture.

The static picture can be a text message, a patterned message or a combination of a text message and a patterned message. The text message can be shown with texts, for example, "connection failed", "no response from the target" or "connection refused". The patterned message, for example, can be a pattern of a trademark, a symbol that implies that the connection is failed or refused.

In the other of the embodiments of the disclosure, the animated picture for example, can be an animation that implies connection failure or alike.

After the second predetermined message picture 217 of step (508) is shown on the second terminal 300 in seconds, a step (509) is processed next.

Step (509) the first network videoconference device 211 automatically responds the second network videoconference device 311 that the first network videoconference device 211 is going to disconnect with the second network videoconference device 311. Go to Step (510).

Step (510) the first network videoconference device 211 and the second network videoconference device 311 are disconnected with each other.

Furthermore, after the first network videoconference device 211 in Step (510) has already disconnected with the second network videoconference device 311, the first network videoconference device 211 may provide a message of "disconnected" to display on the first media player 214.

Thus, the first network videoconference device 211 can passively wait for another call from another terminal again.

Figure 4:
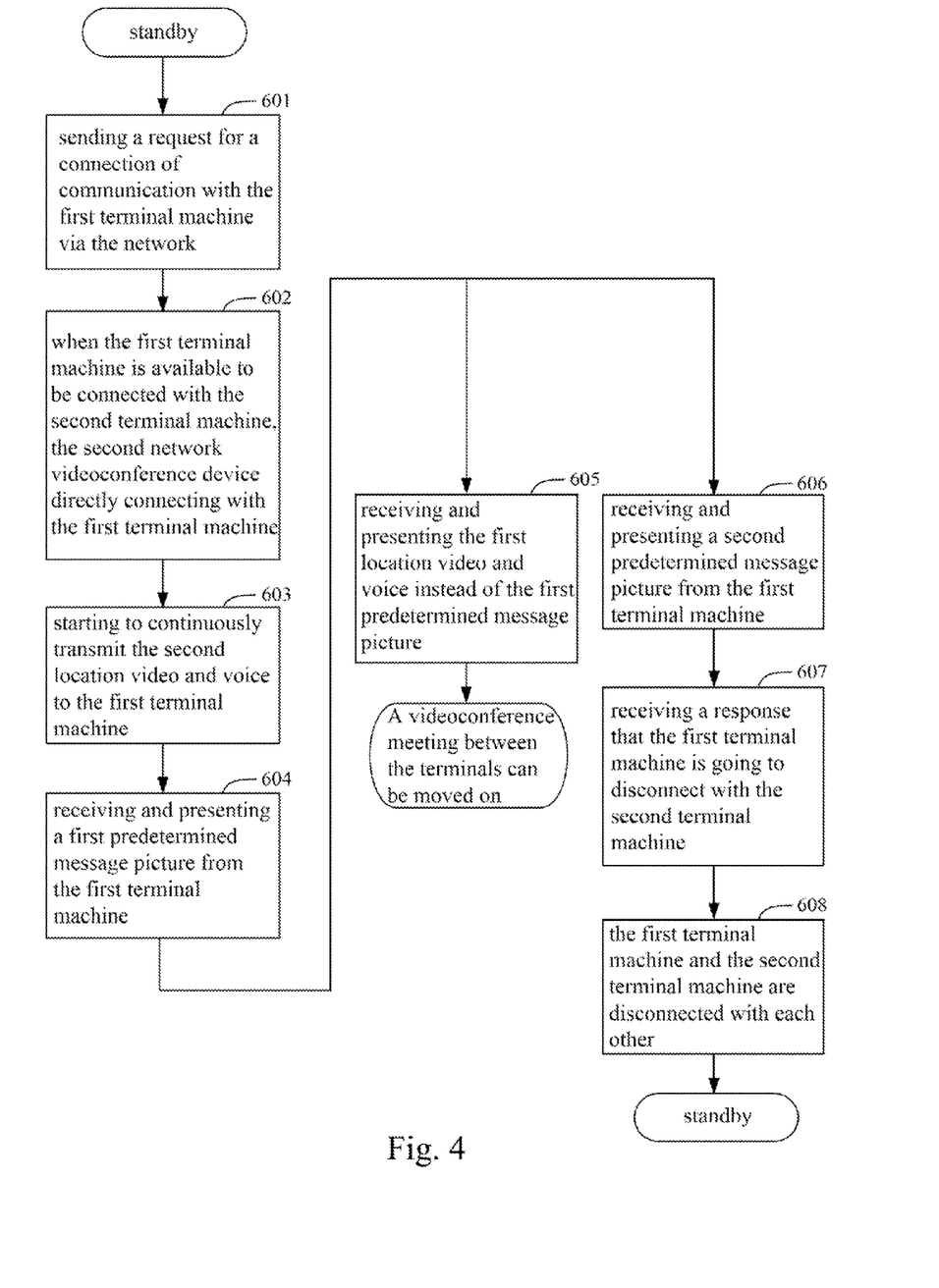
FIG. 4 illustrates a detailed flow chart of the method of proceeding network videoconference operated by the second terminal machine according to the embodiment of the disclosure.

Refer to FIG. 1A, FIG. 1B and FIG. 4, in which FIG. 4 illustrates a detailed flow chart of the method of proceeding network videoconference operated by the second terminal machine 311 according to the embodiment of the disclosure.

In the embodiment of the disclosure, since the second terminal machine 310 of the second terminal 300 intends to make a call to the first terminal machine 210 of the first terminal 200, the second terminal 300 can be potentially took as a calling terminal in the mentioned system 100. The detailed steps that the second terminal machine 310 works are described as follows.

Step (601) the second network videoconference device 311 sends a request for a connection of communication with the first network videoconference device 211 of the first terminal 200 via the network 400, and the request is with information of an IP address and a user name of the second network videoconference device 311.

In this embodiment, the second network videoconference device 311 of the second terminal 300 can call the first network videoconference device 211 of the first terminal 200 by a fashion of dialing. In another embodiment, the second network videoconference device 311 of the second terminal 300 can call the first network videoconference device 211 of the first terminal 200 by a fashion of calling the IP address of the first network videoconference device 211 (e.g. MSN or SKYPE). Go to Step (602).

Step (602) after the second network videoconference device 311 got the response that the first network videoconference device 211 is available to be connected with the second network videoconference device 311 (Step (502)), the second network videoconference device 311 directly connects with the first network videoconference device 211. Go to Step (603).

Step (603) after the first network videoconference device 211 and the second network videoconference device 311 are connected, the second network videoconference device 311 starting to continuously transmit the second location video and voice provided from the second network video camera 312 and the second audio receiving device 313 to the first network videoconference device 211. Go to Step (604).

Step (604) While the second network videoconference device 311 is transmitting the second location video and voice, the second network videoconference device 311 receives a first predetermined message picture 216 provided from the first network videoconference device 211 instead of the first location video and voice, and presents the first predetermined message picture 216 on the second media player 314.

In the embodiment, the variations of the first predetermined message picture 216 has been mentioned above, and will not be introduced again.

Thus, since the first predetermined message picture 216 is shown on the second media player 314, the meeting participants at the second terminal 300 will be suggested that the second terminal machine 310 is still in attempt to connect with the first terminal machine 210. At this moment, the meeting participants at the second terminal 300 only wait for the connection succeeded between the first terminal 200 and the second terminal 300.

Furthermore, at this moment, the meeting participants at the second terminal 300 exposed on the first terminal 200 are unable to know people who actually join the videoconference meeting at the first terminal 200 so as to protect the personal privacy of the meeting participants at the first terminal 200.

Therefore, when the meeting participants at the first terminal 200 agree to proceed the network videoconference, process Step (605); otherwise, when the meeting participants at the first terminal 200 reject to proceed the network videoconference, process Step (606).

Step (605) when the meeting participants at the first terminal 200 agree to proceed the network videoconference, the second network videoconference device 311 starts to receive the first location video and voice provided from the first network video camera 212 and the first audio receiving device 213 instead of the first predetermined message picture 216 displayed previously on the second media player 314.

Therefore, a videoconference meeting between the first terminal 200 and the second terminal 300 can be moved on, and the meeting participators at the first terminal 200 and the second terminal 300 can be contacted to each other by the first location video and voice and the second location video and voice.

Step (606) when the meeting participants at the first terminal 200 reject to proceed the network videoconference, the second network videoconference device 311 starts to receive a second predetermined message picture 217 from the first network videoconference device 211, instead of the first predetermined message picture 216 displayed previously on the second media player 314.

In this embodiment, when the second predetermined message picture 217, for example, is with texts of "connection failed", due to the second predetermined message picture 217, the meeting participants at the second terminal 300 will be suggested that the second terminal machine 310 somehow does not work for connecting with the first terminal machine 210. The meeting participants at the second terminal 300 still do not know the connection failed because the meeting participants at the first terminal 200 reject to do so.

Otherwise, when the second predetermined message picture 217, for example, is with texts of "connection refused", due to the second predetermined message picture 217, the meeting participants at the second terminal 300 will be suggested that the second terminal machine 310 somehow is failed to connect with the first terminal machine 210. The meeting participants at the second terminal 300 still do not know the connection failed because the meeting participants at the first terminal 200 have reviewed the meeting participants at the second terminal 300.

Step (607) after the second predetermined message picture 217 is shown in seconds, the second network videoconference device 311 receives a response that the first network videoconference device 211 is going to disconnect with the second network videoconference device 311. Go to Step (608).

Step (608) the first network videoconference device 211 and the second network videoconference device 311 are disconnected with each other.

Thus, the second network videoconference device 311 is free to send a request for a connection of communication with another terminal via the network 400.

In another embodiment of the disclosure, most features of each step are substantially the same as the embodiment mentioned above, except in Step (503), the first terminal machine 210 may receive only the second location video provided from the second network video camera 312; or even, the first terminal machine may receive only one static photo of the second location video provided from the second network video camera 31 as long as the meeting participants at the first terminal 200 can recognize people who actually join the meeting at the second terminal 300. Therefore, since the first terminal machine 210 does not need to receive and present the entire stream of the second location video and voice from the second terminal machine 310, it reduces the usage of network resource and the waiting time of the meeting participants at the second terminal 300.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A method of proceeding network videoconference implemented on a first terminal machine of a network videoconference system, the method comprising:

directly establishing a connection with a second terminal machine of the network videoconference system without waiting for any instruction of permission when the second terminal machine requests to connect with the first terminal machine;

receiving a second location video and voice provided from the second terminal machine and presenting the second location video and voice on the first terminal machine, sending a first predetermined message picture to the second terminal machine to present, and not sending a first location video and voice temporarily;

providing a human-machine interface on the first terminal machine, wherein the human-machine interface is served for accepting an instruction of proceeding the network videoconference or an instruction of rejecting the network videoconference;

sending a second predetermined message picture to the second terminal machine to present instead of the first predetermined message picture when the human-machine interface accepts the instruction of rejecting the network videoconference; and disconnecting with the second terminal machine after the second predetermined message is sent to the second terminal machine.

2. The method of proceeding network videoconference according to claim 1, further comprises:

starting to send a first location video and voice provided from the first terminal machine to the second terminal machine to present instead of the first predetermined message picture when the human-machine interface accepts the instruction of proceeding the network videoconference.

3. The method of proceeding network videoconference according to claim 1, wherein the first predetermined message picture is a static picture or an animated picture.

4. A network videoconference equipment comprising:

a network videoconference device at a local terminal, served for establishing a connection with a network device at a remote terminal via a network, wherein the network videoconference device comprises a first predetermined message picture, a second predetermined message picture and a human-machine interface served for accepting an instruction of proceeding a network videoconference or an instruction of rejecting a network videoconference;

a network video camera electrically connected with the network videoconference device, and served for obtaining first location videos from the local terminal;

an audio receiving device electrically connected with the network videoconference device, and served for obtaining first location voices from the local terminal; and a media player electrically connected with the network videoconference device, and served for presenting second location videos and voices provided from the network device at the remote terminal via the network, wherein, when the network device requests to connect with the network videoconference equipment, the network videoconference equipment directly connects with the network device, and the network videoconference equipment receives and presents the second location videos and voices from the network device, and, the network videoconference equipment sends the first predetermined message picture to the network device to display, not the first location videos and voices temporarily, and the network videoconference equipment waits for the instruction thereof in order to proceed the network videoconference or not, when the human-machine interface of the network videoconference device accepts the instruction of rejecting the network videoconference, the network videoconference device sends the second predetermined message picture to the network device to display instead of the first predetermined message picture.

5. The network videoconference equipment according to claim 4, wherein the human-machine interface is a virtual operation interface or a mechanical operation interface.

6. The network videoconference equipment according to claim 5, wherein the virtual operation interface is with options shown on a screen of the media player.

7. The network videoconference equipment according to claim 5, wherein the mechanical operation interface is with buttons, turning buttons or push buttons.

8. The method of proceeding network videoconference according to claim 1, wherein the first predetermined message picture brings a message to tell that the connection is now progressing or connecting.

9. The method of proceeding network videoconference according to claim 1, wherein the second predetermined message picture brings a message to tell that the connection is now failed, no response or refused.

10. The network videoconference equipment according to claim 4, wherein the first predetermined message picture brings a message to tell that the connection is now progressing or connecting.

11. The network videoconference equipment according to claim 4, wherein the second predetermined message picture brings a message to tell that the connection is now failed, no response or refused.

* * * * *